(12) United States Patent
Petrelli et al.

(10) Patent No.: US 6,359,980 B1
(45) Date of Patent: Mar. 19, 2002

(54) METHOD FOR ADMINISTERING ADVANCED NUMBER PORTABILITY NUMBERS

(75) Inventors: Robert Petrelli, Neshanic Station; Cecil Bernard Cates, West Orange, both of NJ (US); James Patrick Dunn, Sandwich, IL (US); Ronald Bruce Martin, Carol Stream, IL (US); Jack Ray Penrod, Bolingbrook, IL (US); John William Peterson, Lisle, IL (US); Deborah Margaret Stockert, Singapore (SG)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/651,866

(22) Filed: Aug. 31, 2000

(51) Int. Cl.[7] .......................... H04M 7/00; H04M 3/42; H04M 3/00
(52) U.S. Cl. .......................... 379/221.13; 379/216.01; 379/289
(58) Field of Search ............................. 379/219, 220.01, 379/221.01, 221.13, 289

(56) References Cited

U.S. PATENT DOCUMENTS

| | | | |
|---|---|---|---|
| 5,237,604 A | 8/1993 | Ryan | 379/220 |
| 5,740,239 A | 4/1998 | Bhagat et al. | 379/243 |
| 5,910,981 A | 6/1999 | Bhagat et al. | 379/219 |
| 6,137,873 A | * 10/2000 | Gilles | 379/201 |

* cited by examiner

Primary Examiner—Ahmad Matar
Assistant Examiner—Hector Agdeppa
(74) Attorney, Agent, or Firm—Jack Penrod

(57) ABSTRACT

A method apparatus for finding and assigning both commercially valuable and vanity (CSV) numbers in a telecommunications system that permits number portability. CSV Numbers are identified by a rules based process that combs the unused number database for valuable combination and saves those numbers in a special database. Those numbers that are not so identified stay in the unused database for general assignment. To assign a CSV number, a similar process is used to generate candidate numbers based on a desired keyword, and then the candidate numbers are used to query the special database and even the general unused number database to get available candidates. The available candidates are offered to the requesting user and the user may accept or decline.

14 Claims, 2 Drawing Sheets

METHOD FOR ADMINISTERING ADVANCED NUMBER PORTABILITY NUMBERS

TECHNICAL FIELD

This invention relates to network telephone systems and more particularly to telephone number portability within network telephone systems and the assignment of telephone numbers therein.

BACKGROUND OF THE INVENTION

The public telephone system is operated by entry of a series of numbers by such means as pulse dialing a rotary telephone, pressing buttons of a push button telephone to enter dual tone multiple frequency (DTMF) or pulse codes, and initiating some automatic entry device such as a modem or facsimile machine or out-of-band customer premises equipment signals as in ISDN sets. Currently within United States local telephone calls require seven digits (YXX-XXXX) and long distance calls require the same seven digits plus a three digit area code at the beginning. A long distance code digit of "1" or some other long distance code is also added before the area code and the seven digit local number. Originally the first three digits of a local number identified the telephone switch that would process the call, and to a great extent still do. That was the switch to process the call because historically that was also the switch to which the telephone having that local number was connected. As the original regulated telephone service monopoly to break up and competition began, the idea of number portability became important and popular. A basic form of number portability for people who wanted it is shown in U.S. Pat. No. 5,237,604 issued Aug. 17, 1993 to D. Ryan. In the Telecommunications Act of 1996 local telephone service companies are required to provide local telephone number portability where possible.

Since the Telecommunications Act of 1996, the public switched telephone network (PSTN) has continued to become more open and competitive. Many localities already areas have multiple mobile telephone service providers, multiple long distance service providers and multiple local service providers. For customers to receive the maximum benefit from such competition, true portability of telephone numbers must be provided. Telephone number portability allows the customer to change service providers and/or geographic locations without changing telephone numbers. For commercial enterprises that is important because it means the telephone numbers on the stationary, the business cards, the yellow page advertisements, the fax machine settings and their customers' heads do not change when the enterprise changes its service provider. This is especially important customer has a if a special number that takes advantage of the letter sub-sets of the alphabet that appear on numbers 2 through 9 of a rotary dial or a push button keypad to spell out some significant sequence. Examples of such numbers for toll free commercial entities are: "1-800-ABCDEFG" (also known as "1-800-222-3334") for selling reading and spelling learning aids, or "1-800-HOLIDAY" (also known as "465-4329") for Holiday Inn Hotel reservations and information. Holiday Inn Hotel is a trademark of Bass Hotels and Resorts Inc. Non-toll free special numbers either long distance or local are possible also. Such numbers have a goodwill value, which would be lost if the number was not portable when the customer changed service providers.

Because of the costs in customer goodwill, stationary, and personal contacts, many areas have mandated number portability. Number portability means that numbers not normally assigned to a local telephone switch can be transferred to customers of such a local switch. That is why number portability is sometimes referred to as personal numbering. But the very existence of number portability/personal numbering frees telephone numbers and opens the door for enlarged use of telephone numbers.

SUMMARY OF THE INVENTION

Briefly stated in accordance with one aspect of the invention, the aforementioned problems are solved and an advance in the number portability art achieved by providing a method for compiling valuable number combinations for commercial, personal and even vanity purposes.

In accordance with one aspect of the invention, the aforementioned problems are solved and an advance in the art achieved by providing a method for compiling valuable number combinations which includes the steps of: creating a database of valuable combinations; and comparing a numbers not in use database to said database of valuable combinations to create a second database of valuable combinations that are available for assignment.

In accordance with another aspect of the invention, the aforementioned problems are solved and an advance in the art achieved by providing a method of assigning a telephone number to a user comprising the steps of: creating a database of valuable combinations; comparing numbers not in use to the database of valuable combinations to create a second database of valuable combinations that are available for assignment; entering a keyword into a system for searching the second database; and the system for searching for number that is a character by character match of the keyword, and if a character by character match is found, offering said number to the user. If a character by character match is not available, finding phonic equivalents, synonyms or words associated to the keyword within the context of the keyword and offering the corresponding numbers to the user.

In accordance with another aspect of the invention, the aforementioned problems are solved and an advance in the art achieved by providing a system for issuing numbers having some significance. The system includes a telephone switch that has local number portability capability, a signaling network node having a connection to said telephone switch, a local routing number database connected to said signaling network node, an unused number database connected to said signaling network node with valuable telephone numbers identified, and a terminal connected to said telephone switch for user entry of a keyword for which said unused number database will be searched for a match, if a match is found, issuing said match to said user as a telephone number.

DETAILED DESCRIPTION

Figure 1:
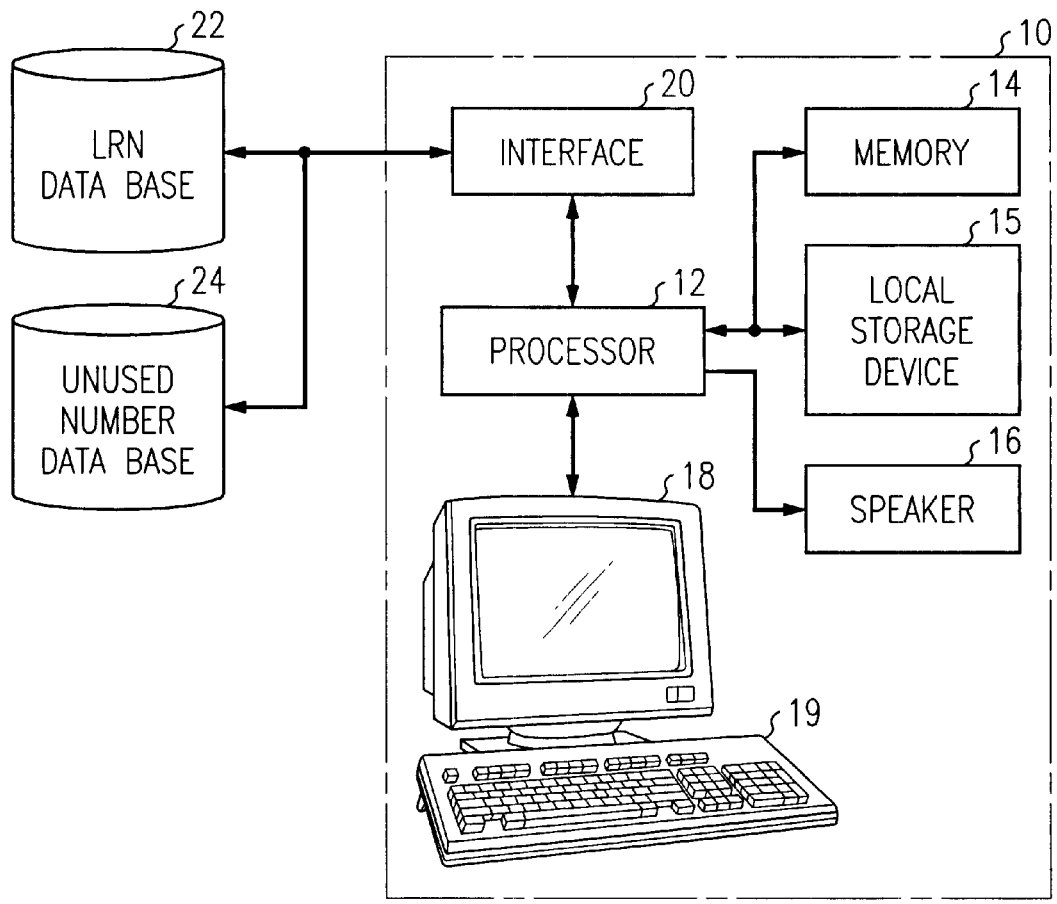
FIG. 1 is a simplified block of a workstation for finding valuable number sequences.

FIG. 1 is a simplified block of a work station 10 useful for practicing an embodiment of the invention. The work station 10 has a processor unit 12 which processes information and outputs information in various forms. Processor 12 is connected to a memory 14 for storing long-term and short term information. Memory 14 may include ROM and RAM or their equivalents, as is known in workstations. Processor 12 is also connected to a local storage device 15, which may be a magnetic disk or similar device for long term storage of fairly large amounts of information such as application programs, files, records, and databases. Processor 12 is also connected to user input and output devices 16, 18 and 19. Output device 16 is a speaker which allows the user to hear beeps and clicks that workstations sometimes output as cues to the operator that something is being processed or needs operator input. Speaker 16 is also used to audibly present tone sequences, such as dual tone multiple frequency (DTMF) sequences to a user for evaluation. Processor 12 is also connected to a keyboard 19 and a display 18 in order to enable input from a user and visual output to a user, as is common with workstations.

Processor 12, memory 14, local storage device 15, speaker 16, display 18 and keyboard 19 enable workstation 10 to perform many reading, comparing, querying and writing tasks on integers, characters and databases quite well. Workstation 10 has considerable capabilities in those areas as a stand alone unit; however, interface 20 allows the workstation 10 to connect to the outside world. In this case, the outside world includes a telecommunications signaling network world and telecommunications network databases, such as local routing number (LRN) database 22. LRN database 22 contains the local routings for all the exchanges for all the local switches that use the database 22. LRN database 22 besides keeping local routing information for numbers in use, also keeps unused number information for the area served by the local switches. This group of unused numbers is used primarily for assigning telephone numbers to new applicants.

Interface 20 also connects workstation 10 to another database, the unused number database (UNDB) 24. UNDB 24 is populated with unused numbers from the other databases, such as LRN 22, and may contain numbers from other than the local routing switch area. The unused numbers in UNDB 24 may be already grouped into groups of numbers that have some intrinsic value and groups of numbers that have been found not to have intrinsic value beyond being able to complete a call. Workstation 10 or a similar station is capable of providing and might provide the testing/filtering action according to names, synonyms, alternative spellings, etc., needed to separate the numbers with intrinsic value from those not found to have intrinsic value.

Figure 2:
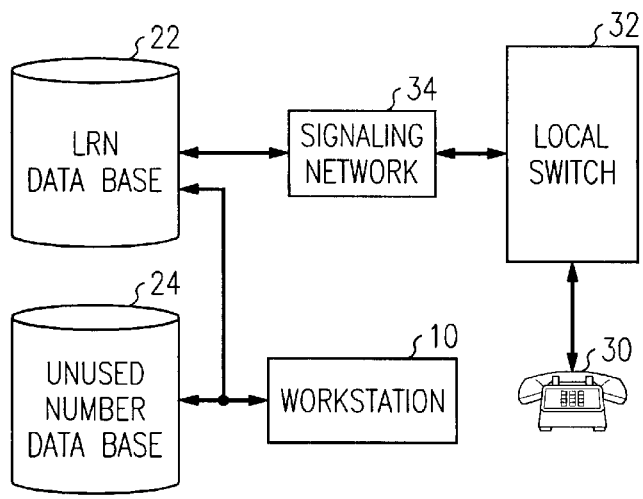
FIG. 2 is a block diagram of a system for finding and using valuable number sequences.

Alternatively, UNDB 24 is just a database of all unused numbers that are available to a user in the user's location. In such a case, the accessing terminal initiates a search of possible number combinations using various rules, such as rules regarding synonyms, and alternative spelling. Such a system is shown in FIG. 2. A user at terminal 30 is connected to a local switch 32. Terminal 30 must at least be a DTMF telephone, but could be more sophisticated such as an ISDN terminal or even a computer terminal. Terminal 30 calls a number selection service number for requesting commercially significant and vanity (CSV) telephone numbers on switch 32. Upon receiving a call from terminal 30, local switch 32 replies with a request that the user at terminal 30 enter the desired CSV number. Local switch 32 then queries databases 22 and 24 via signaling network function 34 as to the availability of the requested CSV number. LRN DB 22 and UNDB 24 respond to local switch 32 with a number available or a number not available response. If the user requested CSV number is available, then local switch 32 assigns that number to the user and makes charges according to whatever financial arrangements exist between the service provider owning local switch 32 and the user. Along with the character by character query, local switch 32 may also query LRN DB 22 and UNDB 24 for related CSV number candidates that are not character by character matches. The query for numbers related to a user CSV numbers takes some processing power, which may be at switch 32, in the databases themselves 22, 24 or resort may be made to a workstation such as workstation 10. The query for related numbers will be a limited special case of the process that searches for CSV numbers, so workstation 10 is a good choice to provide the processing power.

One or more CSV number candidates are returned from LRN DB 22 and UNDB 24. They are presented to the user for selection and approval. Preferably, any price premium(s) for high intrinsic value number(s) is presented at this time for user's selection and approval, also. Thus, the user can evaluate whether the CSV number is worth the premium cost. If the CSV number is not worth the cost, but the user needs a new telephone number of some sort, one of the non-premium numbers is issued to the user. If one of the vanity numbers is worth the cost, the user accepts a premium number and the premium cost. This cost may be billed to the user's telephone bill, or charged to an account number, such as a credit card account. After selection of a number by the user, the number is removed from the data base of unused numbers in UNDB 24 so it will not be issued to someone else.

Figure 3:
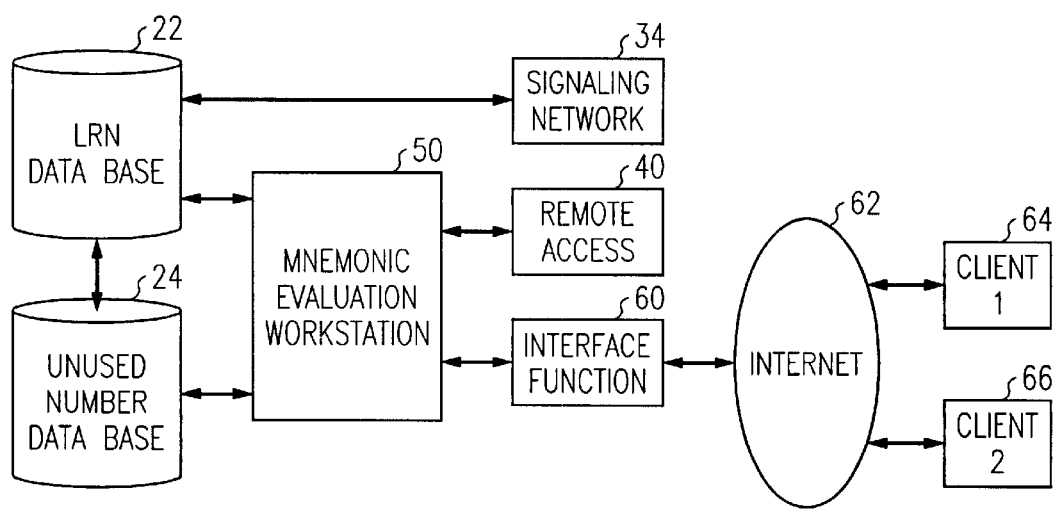
FIG. 3 is a block diagram of a system for matching a customer inquiry for a type of valuable number sequences.

Referring now to FIG. 3, another embodiment of the present invention will be described. This embodiment concerns a sale of a user's existing telephone number as a premium number. Often commercial users are assigned a block of telephone numbers for a fee. This embodiment recognizes that quite often the entire block is not used by the commercial enterprise and that there may be some premium number combinations within the block. With the flexibility of number portability, unused premium numbers could be offered and sold by the block number holder. Such a commercial user would use remote access terminal 40, or a similar device to access MNEMONIC EVALUATION WORKSTATION 50. MNEMONIC EVALUATION WORKSTATION 50 receives one or more numbers from remote access unit 40 that the commercial user would like to sell. Workstation 50 processes the query or queries from remote access unit 40 to evaluate the value of the number(s) provided according to programmed rules. The numbers are evaluated for context as a word, context as a string of works, context as an alphabetic string, context as an alpha-numeric string and context as a tone sequence. Workstation 50 uses a rules based program similar to the premium number finding program used by workstation 10 to come up with a premium number database in order to evaluate the value of the number submitted for sale by the user. Word contexts may be exact spellings of names or descriptive nouns. For example, for a bakery, a number containing 'bakery' (225379) would be a direct context. Further, telephone numbers containing words such as 'bread' (27323) or 'cakes' (22537) might also make good telephone numbers for a bakery. Workstation 50 also looks for word strings: 'hot buns' is an example of a possible two word string for a bakery. Alphabetic strings are inexact spellings of words such as 'bakry' (22579) for a bakery. Alphanumeric strings are strings that describe the user using letters and numbers somehow. Bakeryl (2253791) is one example for bakery number one. Tonal strings are tone sequences that have some meaning to the caller and thus aid in remembering the number. The tone sequence 3334 or 33343334, which sound like the theme of Beethoven's fifth symphony, are examples of possible numbers for a music store or a local symphony's ticket and information number. Tone sequence rules about determining dominate themes from number of times used in a work and tone translation/transposition rules to establish known tone sequences available by DTMF tones on a telephone are used. Once such tone sequence rules are set up, workstation 50 builds a database of tone sequences and associate the context of the work with the derived sequence by processing musical pieces. Alternatively, a human with knowledge of significant musical tone sequences would perform the tone sequence database.

Once workstation 50 has been programmed to process number queries, it may accept numbers for evaluation from remote access unit 40. The workstation 50 can offer the commercial user a predetermined price depending on how long the number is and how good a CSV word (i.e. exact spelling vis-à-vis a phonic or approximate spelling) it is and the user can purchase the number or not. Alternatively, the number or numbers may be auctioned off. Such an auction could be held on the world wide web or some equivalent public forum. To facilitate such an auction, the offered numbers would be set out on a web page after being processed by workstation 50. Workstation 50 or some other workstation (not shown) would operate as a web server. The web server would connect via interface 60 to the Internet 62. Client 1 (64) and client 2 (66) using web browsers or similar interfaces would view the web page and have an opportunity to bid on the premium telephone numbers. Upon the end of the auction, the web server workstation would charge the winning party the auction price and issue the number to the winning party.

This is all make possible and practical because of mandated number portability so numbers can migrate across more than one local switch location.

Thus, there has been disclosed a method and apparatus for identifying telephone numbers that have value, either because of commercial significance through association with the owner or the goods and/or services provided by the owner or because of vanity appeal much like vanity license plates for automobiles.

Although this invention has been described with respect to a preferred embodiment, those skilled in the art may devise numerous other arrangements without departing from the scope of the invention as defined in the following claims.

What is claimed is:

1. A method for compiling valuable number combinations comprising the steps of:
   a. creating a database of valuable combinations; and
   b. comparing a numbers not in use database to said database of valuable combinations to create a second database of valuable combinations that are available for assignment.

2. The method of claim 1, further comprising the step of: after step b, comparing each number surrendered to the numbers not in use database to said database of valuable combinations and if a match occurs, adding each number surrendered that matches an entry of said database of valuable combinations to said second database of valuable combinations that are available for assignment.

3. The method of claim 1 wherein said step of creating a database of valuable combinations includes adding to the database telephone numbers that have contextual value.

4. The method of claim 1 wherein said step of creating a database of valuable combinations includes adding to the database telephone numbers that have visual pattern value.

5. The method of claim 1 wherein said step of creating a database of valuable combinations includes adding to the database telephone numbers that have tonal pattern value.

6. A method of assigning a telephone number to a user comprising the steps of:
   a. creating a database of valuable combinations;
   b. comparing numbers not in use to said database of valuable combinations to create a second database of valuable combinations that are available for assignment;
   c. entering a keyword into a system for searching said second database; and
   d. said system for searching for number that is a character by character match of said keyword, and if a character by character match is found, offering said number to said user.

7. The method of claim 6 further comprising the step of removing said number from said second database after assignment to the user.

8. The method of claim 6 of assigning a telephone number to a user, further comprising the steps of:
   if a character by character match is not found, searching for a character by character match using at least one phonetic equivalent characters and if a phonetic equivalent match is found, offering said phonetic equivalent match to said user for monetary consideration.

9. The method of claim 6 of assigning a telephone number to a user, further comprising the steps of:
   if a character by character match is not found, searching for an equivalent within the context of the keyword and if such an equivalent match is found, offering said equivalent match to said user for monetary consideration.

10. The method of claim 9, wherein said equivalent uses an alphabetic string.

11. The method of claim 9, wherein said equivalent uses an alphanumeric string.

12. The method of claim 9, wherein said equivalent is a synonym of the keyword.

13. The method of claim 9, wherein said equivalent uses a DTMF tonal sequence having contextual significance relative to the keyword.

14. A system for issuing numbers, comprising:
   a telephone switch that has local number portability capability;
   a signaling network node having a connection to said telephone switch;
   a local routing number database connected to said signaling network node;
   an unused number database connected to said signaling network node with valuable telephone numbers identified; and
   a terminal connected to said telephone switch for user entry of a keyword for which said unused number database will be searched for a match, if a match is found, issuing said match to said user as a telephone number.

* * * * *